US011407514B2

(12) United States Patent
Puglisi et al.

(10) Patent No.: US 11,407,514 B2
(45) Date of Patent: Aug. 9, 2022

(54) END BAY ASSEMBLY WITH DEPLOYABLE STEP AND DEPLOYABLE STEP CONSTRUCTIONS

(71) Applicant: B/E Aerospace, Inc., Winston-Salem, NC (US)

(72) Inventors: Stephen A. Puglisi, Greensboro, NC (US); Daniel I. Udriste, Winston-Salem, NC (US); Horng jaan Lin, Winston-Salem, NC (US); Ryan J. Suhre, Winston-Salem, NC (US); Jason M. Kearns, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 246 days.

(21) Appl. No.: 16/545,178

(22) Filed: Aug. 20, 2019

(65) Prior Publication Data
US 2021/0053686 A1  Feb. 25, 2021

(51) Int. Cl.
*B64D 11/06* (2006.01)
(52) U.S. Cl.
CPC ................ *B64D 11/0693* (2013.01)
(58) Field of Classification Search
CPC ............... B64D 11/0693; B64D 11/06
See application file for complete search history.

(56) References Cited

U.S. PATENT DOCUMENTS

| 6,471,002 | B1 | 10/2002 | Weinerman | |
|---|---|---|---|---|
| 8,905,354 | B2 * | 12/2014 | Griffiths | B64C 1/24 244/129.6 |
| 10,723,273 | B1 * | 7/2020 | Gray | B60R 3/02 |
| 11,135,306 | B2 * | 10/2021 | Lin | A61K 47/61 |
| 2011/0272524 | A1 * | 11/2011 | Gorlich | B64C 1/24 244/129.6 |
| 2014/0110193 | A1 * | 4/2014 | Conley | B60R 3/02 182/91 |
| 2014/0300147 | A1 | 10/2014 | Suhre et al. | |
| 2015/0274302 | A1 | 10/2015 | Suhre et al. | |
| 2020/0369389 | A1 * | 11/2020 | Dowty | B64D 11/06395 |

FOREIGN PATENT DOCUMENTS

EP      0105741 A2 *  4/1984  ......... B64D 11/0638

* cited by examiner

*Primary Examiner* — Justin M Benedik
(74) *Attorney, Agent, or Firm* — Suiter Swantz pc llo (57) ABSTRACT

A step assembly installable in a structure such as a housing of an armrest assembly, the step assembly including a base attachable to the structure including a mounting plate having a low profile and a fixed receptacle to be received in the structure, a step plate pivotally attached along a first end to the base along a lower end of the receptacle, the step plate pivotable between a stowed position in which the step plate is housed within the fixed receptacle and a deployed position in which the step plate is outside of the fixed receptacle, the step plate having a first side for supporting a foot, and a release mechanism for releasing the step plate from the stowed position to the deployed position. The step plate deployed for use and concealed from view between uses.

7 Claims, 7 Drawing Sheets

END BAY ASSEMBLY WITH DEPLOYABLE STEP AND DEPLOYABLE STEP CONSTRUCTIONS

BACKGROUND

Passenger cabins are commonly configured with seating areas and object stowage areas. In aircraft passenger cabins, object stowage areas can be provided under seats and in overhead compartments or bins. While under seat stowage is easily accessible by passengers and flight crew, overhead stowage can be difficult to reach and access, particularly by those short in stature.

Seating areas on commercial aircraft are commonly divided into seating classes, where the primary differentiators among classes are seating density and seat construction. For example, economy class seat constructions typically include closely spaced rows of attached seats having pivotable inboard armrests and a fixed armrest positioned along the aisle. Premium class seat constructions typically have a greater seat pitch between rows as well as adjustable seat features. For example, armrests along the aisle may adjust vertically to provide a raised armrest position for comfort and a lowered armrest position for ingress and egress. The ability to lower an armrest to a height near or equal that of the seat bottom greatly facilitates access for those with limited mobility. Some vertically adjustable armrest constructions can include a fixed end bay and an armrest assembly that tracks vertically within the end bay between the raised and lowered positions.

Accordingly, to extend the overhead reach of the flight crew without impeding the functionality of adjustable features, what is needed are deployable step constructions installable in assemblies such as armrest end bay assemblies.

SUMMARY OF THE INVENTIVE ASPECTS

To achieve the foregoing and other advantages, the inventive aspects disclosed herein are directed to a step assembly including a base attachable to a fixed assembly and including a mounting plate having a low profile and a fixed receptacle to be received in the fixed assembly, a step plate pivotally attached along a first end to the base along a lower end of the receptacle, the step plate pivotable between a stowed position in which the step plate is housed within the fixed receptacle and a deployed position in which the step plate is outside of the fixed receptacle, the step plate having a first side for supporting a foot, and a release mechanism for releasing the step plate from the stowed position to the deployed position.

In some embodiments, the release mechanism includes a clip retaining the step plate in the stowed position until released, the clip mounted in an upper end of the receptacle to engage a second end of the step plate in the stowed position, the clip user actuated to release the step plate from the stowed position.

In some embodiments, the release mechanism includes a one of a user actuatable release button locatable along a side of the fixed assembly, a magnetic locking device releasable by a magnetic key, and a pivoting lever pivotally attachable to the fixed assembly, the pivoting lever moveable between a latching position at which the second end of the step plate is retained by the clip when the step plate is pivoted upward to the stowed position and an unlatching position at which the step plate is released by the clip to pivot from the stowed position to the deployed position, wherein the pivoting lever automatically pivots to the latching position as the step plate is returned to the stowed position thereby automatically engaging the second end of the step plate with the clip.

In some embodiments, the step assembly further includes a ridge positioned along a second end of the step plate atop the first side.

In some embodiments, movement of the step plate is spring biased toward at least one of the stowed and deployed positions.

In another aspect, the inventive concepts disclosed herein are directed to an armrest assembly including a fixed housing, an armrest moveable relative to the fixed housing, and a step assembly attached to the fixed housing. The step assembly includes a base attached to the fixed housing including a mounting plate having a low profile and a fixed receptacle to be received in the fixed housing, a step plate pivotally attached along a first end to the base along a lower end of the receptacle, the step plate pivotable between a stowed position in which the step plate is housed within the fixed receptacle and a deployed position in which the step plate is outside of the fixed receptacle, the step plate having a first side for supporting a foot, and a release mechanism for releasing the step plate from the stowed position to the deployed position.

In some embodiments, the fixed housing includes a first side positionable facing an aisle, a second side positionable facing away from the aisle, a first end, and a second end, wherein the step assembly is attached to the first side or the first end.

In some embodiments, a first portion of the base is attached to the first side of the fixed housing, a second portion of the base wraps around a corner junction between the first side and the first end of the fixed housing, and a third portion of the base is attached to the first end of the fixed housing.

In yet another aspect, the inventive concepts disclosed herein are directed to a step assembly including a base attachable to a fixed assembly, the base having a fixed receptacle to be received in the fixed assembly and a step provided along a lower end of the fixed receptacle, and a door pivotally attached along one end to the base along an upper end of the receptacle, the door pivotable between a closed position covering an opening to the receptacle and concealing the step, and an open position within the receptacle and revealing the step, wherein the door is spring biased toward the closed position and moved to the open position by pressing the door toward the open position.

In some embodiments, the fixed assembly is an armrest assembly including a fixed housing and an armrest moveable relative to the fixed housing, the fixed housing having a first side positionable facing an aisle, a second side positionable facing away from the aisle, a first end, and a second end, wherein the step assembly is installed in the first side with the door facing the aisle.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

In various embodiments, a step assembly is provided for an aircraft passenger cabin environment. The step assembly may be used by flight attendants to extend their vertical reach to access and load overhead bins and other elevated stowage compartments. A step assembly according to these descriptions, of which the drawings are a part, can built into an aisle-side end bay of a passenger seat or other accessible support structure below elevated passenger cabin features that are otherwise challenging to reach for some attendants and other users. In some of the described examples, the step assembly has a stowed position and a deployed position. In the stowed position, a deployable step plate is in a low-profile or relatively flush position relative to the support structure on which or in which the step assembly is mounted. In the deployed position, the deployable step plate extends outward from a support structure to hold the weight of a user and any items they are lifting. The some described examples, the step assembly is sunken into a support structure such as a seating end bay, and to use the step plate an attendant can insert a foot onto the step plate or into a sunken receptacle where the step plate stows. A pivoting door or plate may cover the receptacle, in various examples, to close out the step assembly or receptacle for aesthetic purposes and to reduce its appearance and likelihood of notice and use by passengers accordingly. A step assembly may include a spring-return or lift-assist feature to help restore the stowed position after use.

Figure 1:
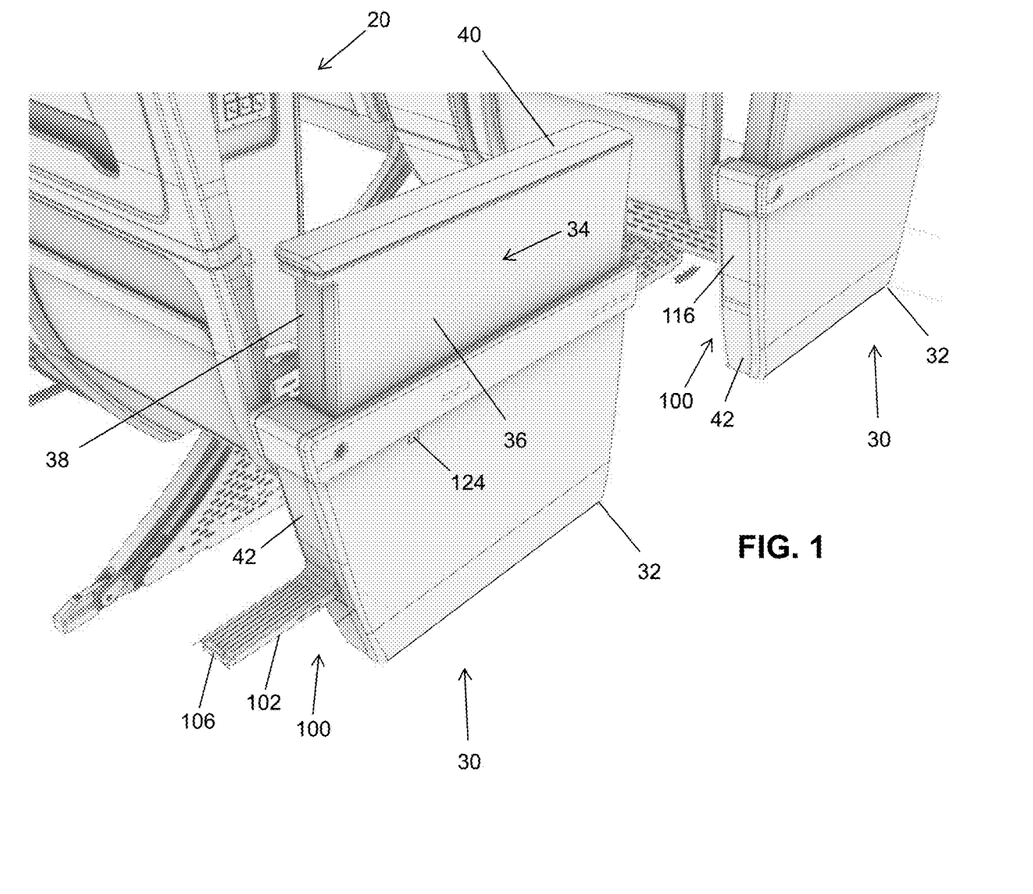
FIG. 1 is a perspective view of a deployable step assembly, according to the present disclosure, shown in a deployed position from an end of a passenger seat end bay.

Referring to FIG. 1, a non-limiting example of a passenger seat, generally referenced as seat 20, having an aisle-side end bay 30 is shown to illustrate an expected environment and use of inventive step assemblies according to these descriptions. The end bay 30 has a fixed main housing 32 connected to a floor of the passenger cabin. An armrest 34 can be adjustably lowered from the illustrated elevated deployed position to a stowed position where the sidewalls 36 and end walls 38 of the armrest 34 are lowered into the fixed main housing 32. The top side 40 of the armrest 34 can be used to support the arm of a seat occupant in a desired deployed position raised from the stowed position. In the stowed position, access for entry and egress into the seating row is facilitated and minimally constricted, an advantage that can serve limited mobility passengers or can serve general freedom of access and comfort for any passenger or flight attendant.

Figure 2:
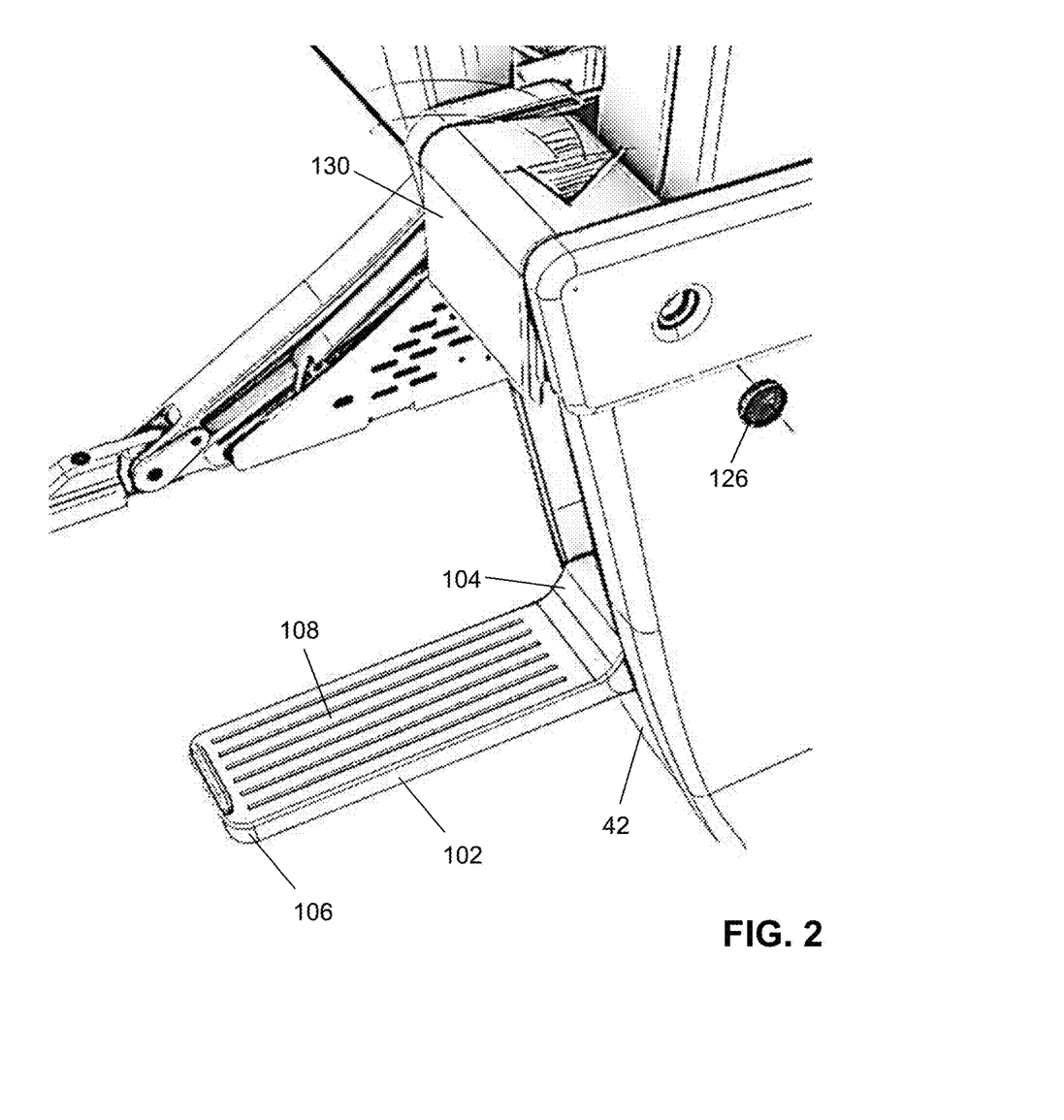
FIG. 2 is a perspective view of the deployable step assembly of FIG. 1, shown in a stowed position in the passenger seat end bay.
Figure 3:
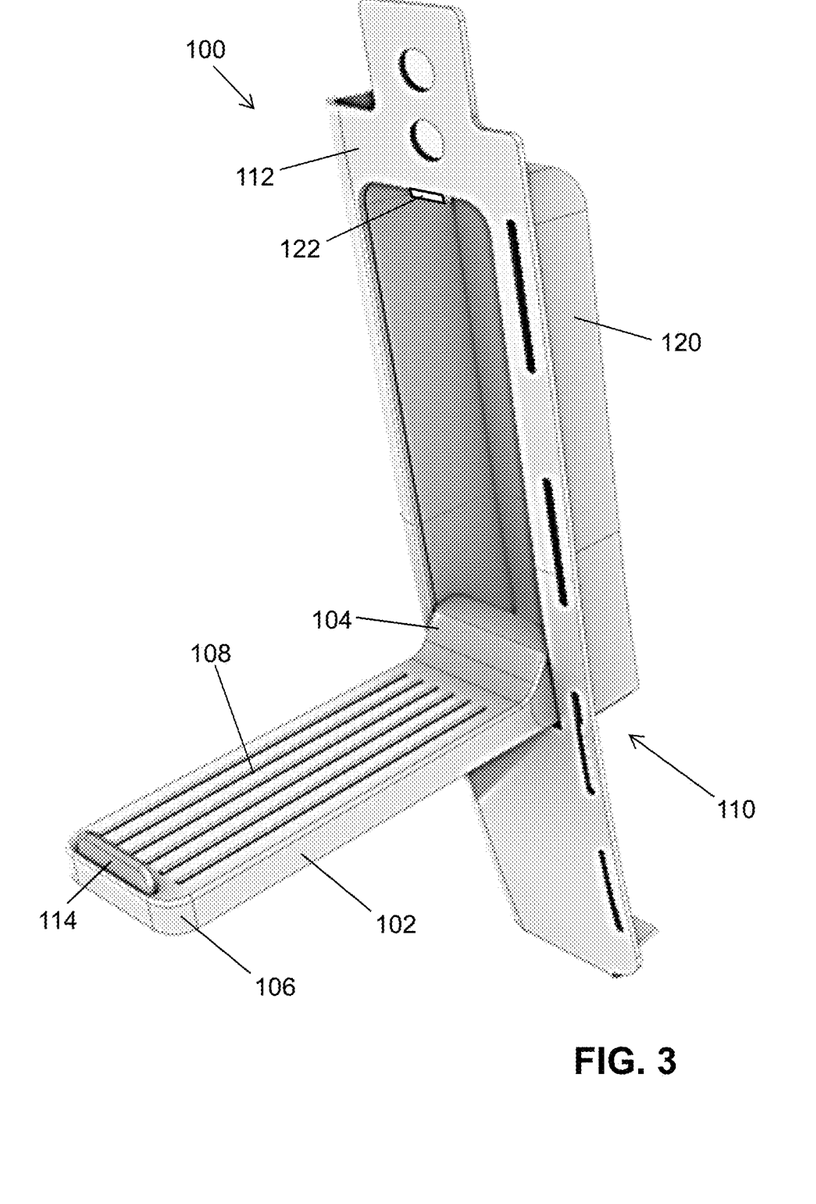
FIG. 3 is a perspective view of the deployable step assembly of FIG. 1, in a deployed position, without illustration of an end bay.

In the example of FIGS. 1-3, an inventive step assembly 100 is implemented as installed in a rearward end wall 42 of an end bay housing 32. Two end bays are shown in FIG. 1, each with a respective deployable step assembly 100, according to the present disclosure. The step assembly 100 in the more forward end bay is shown in a stowed position. The step assembly 100 in the more rearward end bay is shown in a deployed position. FIG. 2 is an enlarged view of the step assembly 100 in a deployed position for use. FIG. 3 shows the step assembly 100, generally in a deployed position, without illustration of an end bay, for illustration of portions of the step assembly 100 that are sunken when installed in an end bay end wall 42 as in FIGS. 1 and 2.

The step assembly 100 includes a deployable step plate 102 pivotally attached to a base 110. The base 110 is fixedly attached to the end bay when the step assembly 100 is installed, and is accordingly treated as stationary in these descriptions. The base 110 has a mounting plate 112 with openings for receiving connectors such as screws, bolts, rivets or other fasteners by which the mounting plate 112 is to be attached to a support structure such as the illustrated end bay. The mounting plate 112 is generally low profile when installed into a support structure, and thus may be flush with, sunken, or slightly raised. The mounting plate 112 is generally vertical or partially inclined to match a support structure when installed. A fixed receptacle 120 for receiving the pivotable step plate 102 in the stowed position extends into the host support structure from the mounting plate 112 in a direction opposite that in which the step plate 102 extends from the base 110 in the deployed position. When installed, the fixed receptacle 120 is sunken into a host support structure such as the end bay.

A first end 104 of the step plate 102 is pivotally attached the base along a lower end of the receptacle 120. The step plate 102 transitions from a stowed position to a deployed position corresponding respectively to the stowed and deployed positions of the step assembly 100. The step plate 102 pivots about the first end 104 from the deployed position to the stowed position. A second end 106 of the step plate 102, opposite the first end 104, extends outward from the receptacle 120 in the deployed position. The step plate 102 has a first side 108 for supporting the foot of a flight attendant or other user in the stowed position in which the first side 108 is generally horizontal, and faces generally vertically upward, to provide a safe step surface. The first side 108 of the step plate 102 has traction grooves in the illustrated example to prevent slipping when used as a step surface. Other traction features including textures, embossing, or abrasives may be used in other examples with or in lieu of the traction grooves. For example, a ridge 114 extends from the first side 108 of the step plate 102 at the second end 106, providing anti-slip engagement when used as a step surface.

Upon pivoting into the stowed position, the step plate 102 is upright or inclined to match the end bay, such that the first side 108 of the step plate 102 faces into the receptacle 120 and a second side 116 of the step plate 102, opposite the first side 108, faces outward. As shown in the forward end bay example of FIG. 1, the second side 116, in the stowed position of the step assembly 100, covers or closes out the receptacle, essentially flush with the rearward end wall of the end bay for aesthetic purposes and to reduce its appearance and likelihood of notice and use by passengers accordingly.

The base 110 includes a clip 122 (FIG. 3) that retains the step plate 102 in the upright or inclined stowed position until released. The clip 122 is mounted in an upper end of the receptacle 120 to engage the second end 106 of the step plate 102 in the stowed position. The clip 122 can be user actuated to release the step plate 102 from the stowed position by various user actuatable release mechanisms in various implementations of the deployable step assembly 100. Three particular examples of release mechanisms are shown in FIGS. 1 and 2.

An optional first example of a release mechanism includes a user actuatable release button 124 (FIG. 1) located along the outer side or aisle facing side of the end bay facing away from any seat occupants to prevent use by passengers. When the release button is pressed, the step plate 102 is released by the clip to pivot from the stowed position to the stowed position.

An optional second example of a release mechanism includes a magnetic locking device 126 (FIG. 2) released by a magnetic key, for example available only to authorized users such as flight attendants. When the release mechanism is actuated by a magnetic key, the step plate 102 is released by the clip 122 to pivot from the stowed position to the deployed position.

An optional third example of a release mechanism includes a pivoting lever 130, for example pivotally attached to the top of the rearward end wall of the end bay housing. In FIG. 1, the pivoting lever 130 is shown in its latching position, at which the second end 106 of the step plate 102 will be retained by the clip if the step plate 102 is pivoted upward to the stowed position. In FIG. 2, the pivoting lever 130 is shown in its unlatching position, at which the step plate 102 is released by the clip 122 to pivot from the stowed position to the deployed position. In at least one example, the pivoting lever 130 automatically pivots to the latching position as the step plate 102 is returned to the stowed position, thereby automatically engaging the second end 106 of the step plate 102 with the clip. To release the step plate 102 from the stowed position, a user such as a flight attendant can pivot the lever to the unlatching position.

Movement of the step plate 102 from the stowed position may be assisted by spring biasing and/or by gravity as the step plate 102 pivots downward to the deployed position. Movement of the step plate 102 from the deployed position to the upright or inclined stowed position may also be assisted by spring biasing and/or by gravity. For example, the step plate 102 may be loaded with a spring for auto reset to the upright position upon being released from the horizontal stowed position. The step plate 102 can also or alternatively be flipped up with a motion of a user's foot or by other user action.

In other options, the second or upper end of the upright step plate 102 in the stowed position can be pushed down to unfold the step plate 102 down to the deployed position. The step plate 102 may be released to spring upward to the stowed position when tapped, at the deployed position, by a user, for example by foot.

Figure 4:
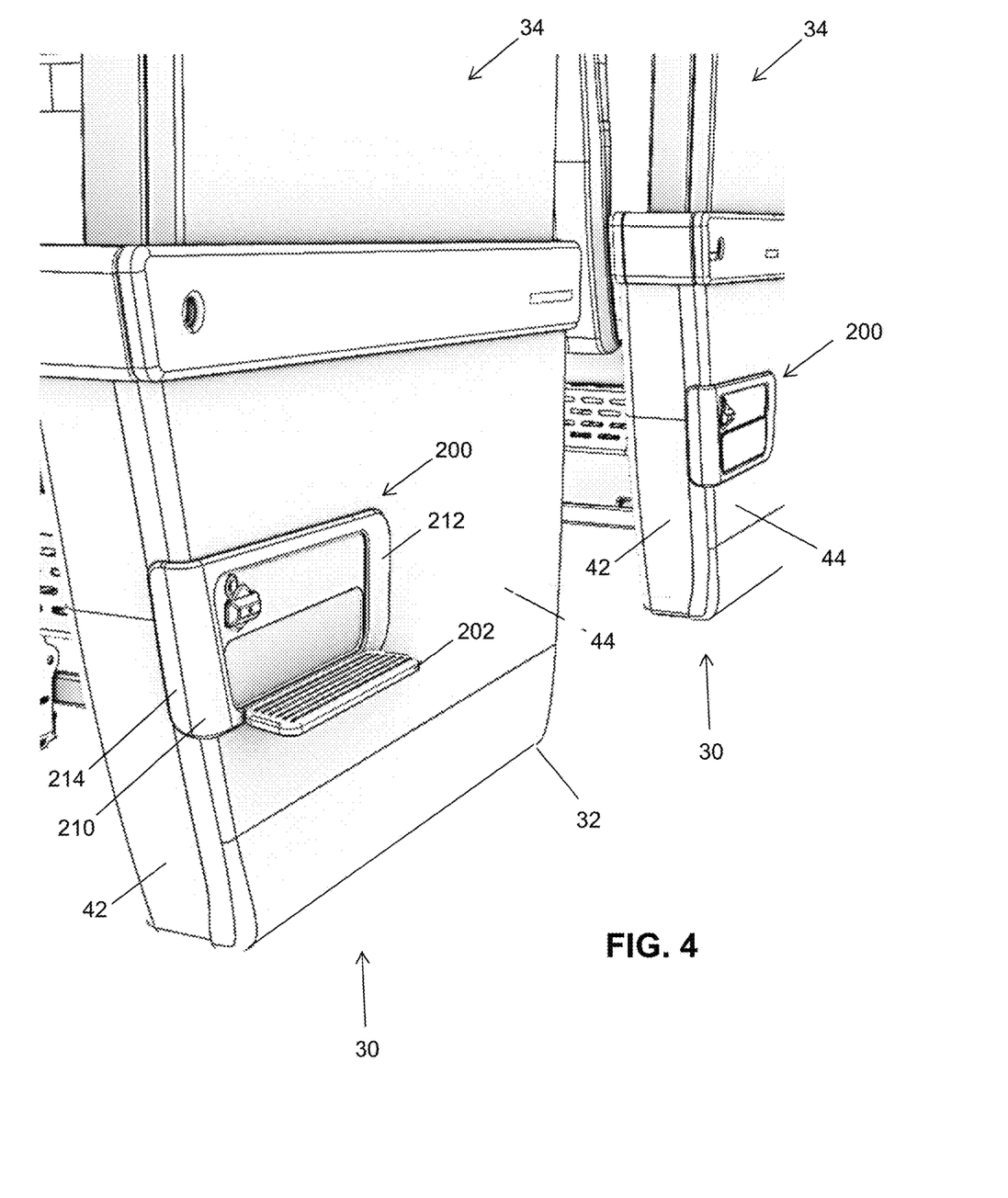
FIG. 4 is a perspective view of another deployable step assembly, according to the present disclosure, shown in a deployed position from a side of a passenger seat end bay.
Figure 5:
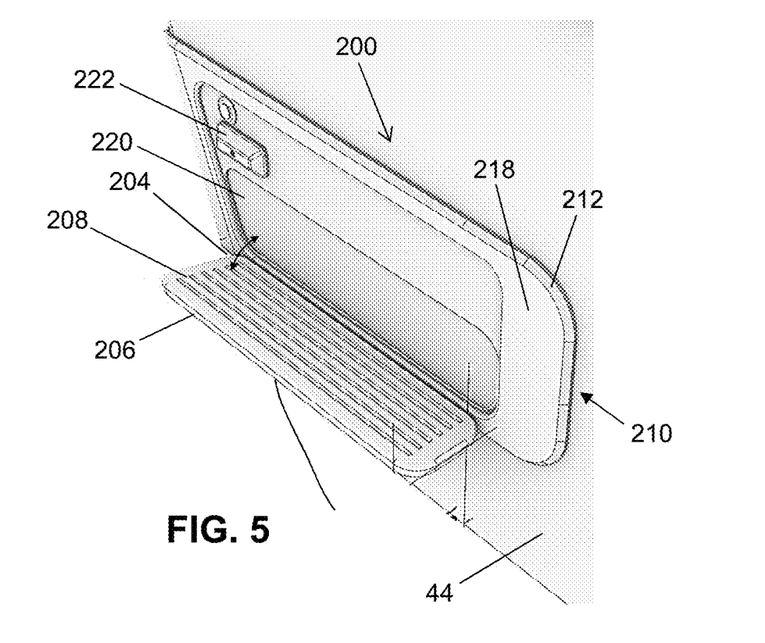
FIG. 5 is a perspective view of the deployable step assembly of FIG. 4, shown in a stowed position in the passenger seat end bay.
Figure 6:
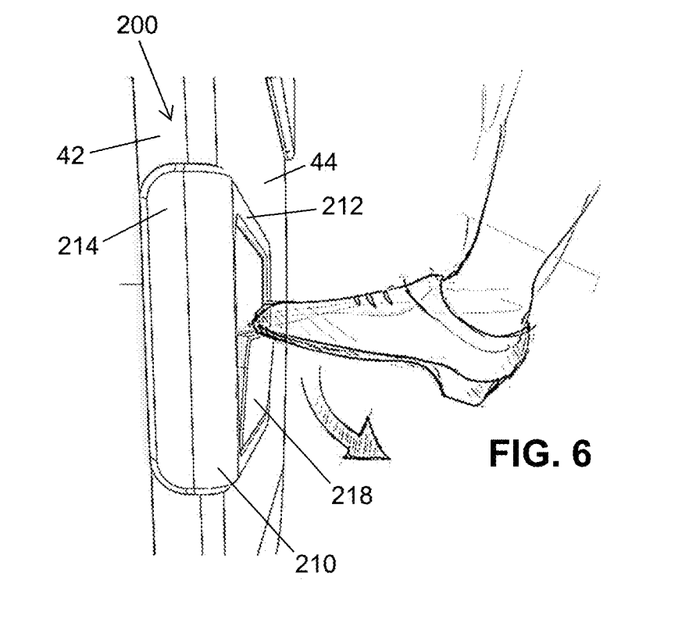
FIG. 6 is a perspective view of the deployable step assembly of FIG. 1, in a deployed position.

In the example of FIGS. 4-6, the inventive step assembly 200 is implemented as an assembly mountable on the aisle facing sidewall 44 of an end bay housing 32. Two end bays 30 are shown in FIG. 4, each with a respective deployable step assembly 200, according to the present disclosure. The step assembly 200 in the more forward end bay 30 is shown in a stowed position. The step assembly 200 in the more rearward end bay is shown in a deployed position. FIG. 5 is an enlarged view of the step assembly 200 in a deployed position for use. FIG. 6 shows the step assembly 200, generally in a stowed position, with a user's foot engaging the step assembly 200 thereof to deploy the step plate 202 thereof.

The step plate 202 is pivotally attached to a base 210. The base 210 is fixedly attached to the end bay when the step assembly 200 is installed, and is accordingly treated as stationary in these descriptions. The base 210, in the illustrated embodiment, mounts externally upon at least one outer wall of the end bay housing 32. In contrast to the sunken aspects of the step assembly 100 of FIGS. 1-3, and the step assembly 300 of FIGS. 7-8, the step assembly 200 of FIGS. 4-6 mounts to and resides along one or more outer wall of the end bay without having sunken portions.

The base 210 has a first mounting plate 212 for mounting on the sidewall 33 of the end bay housing or other support structure. The base in the illustrated embodiment has a partial wrap-around feature implemented as a second mounting plate 214, connected to the first mounting plate 212, for mounting on the rearward end wall 42 of the end bay housing 32 or other support structure. The second mounting plate 214 is generally transverse or perpendicular to the first mounting plate 212 such that, together, the mounting plates wrap around and engage the corner junction of the end wall 42 and sidewall 44 of the end bay housing.

The first mounting plate 212, without having a sunken portion, is raised relative to the sidewall 44 of the end bay but is generally low profile when installed. The first mounting plate 212 and second mounting plate 214 are each generally vertical or partially inclined to match their host support structure when installed, which is the end bay 30 in the illustrated example. A shallow receptacle 220 for receiving the pivotable step plate 202 in the stowed position is defined in the outer side 218 of the first mounting plate 212. When installed, a mounting side of the mounting plate, opposite the outer side 218, is fixed to the host support structure such as the end bay sidewall 44. This may be done by screws, bolts, rivets, adhesive, or any combination of these and/or other attachment elements.

A first end 204 (FIG. 5) of the step plate 202 is pivotally attached the base along a lower end of the receptacle 220. The step plate 202 pivots about the first end 204 from the stowed position 224 to the stowed position. A second end 206 of the step plate 202, opposite the first end 204, extends outward from the receptacle in the stowed position. The step plate 202 has a first side 208 for supporting the foot of a flight attendant or other user in the stowed position in which the first side 208 is generally horizontal, and faces generally vertically upward, to provide a safe step surface. The first side 208 of the step plate 202 has traction grooves in the illustrated example to prevent slipping when used as a step surface. Other traction features including textures, embossing, or abrasives may be used in other examples with or in lieu of the traction grooves to provide anti-slip engagement when used as a step surface.

As shown in FIG. 4, by attaching the first mounting plate to the sidewall of the end bay, the step assembly 200 is installed to deploy the step plate 202 toward an aisle away from a passenger seat. As shown in FIG. 6, the step plate 202 can flipped down by the foot of a flight attendant for use in extending his or her reach toward overhead bins and such. The hinge by which the step plate 202 pivots may be step assembly 200 may be spring loaded to provide positive locking and unlocking in each of the stowed and deployed position. A hinge spring or other spring may provide lift assist in raising the step plate 202 to the upright stowed position. For example, a use may tap the step plate 202 in either the stowed position or deployed position to transition the step plate 202 to the either position.

The base 210 serves as a housing that receives the first side 208 of step plate 202 in the receptacle 220 in the stowed position of the step assembly 200. As shown in the forward end bay example of FIG. 4, the second side 209 of the step plate 202, in the stowed position of the step assembly 200, covers or closes out the receptacle, essentially flush with the outer side of the first mounting plate 212, for aesthetic purposes and to reduce the appearance of the step assembly and likelihood of notice and use by passengers accordingly.

In at least one example, the base 210 is made of, or includes in its construction, durable plastic. The step plate 202 can be made of metal for strength and durability. Other materials can be used in combination with those particularly described. As shown in the illustrated example, the aisle marker lights 222 may be included on the base, for example on the first mounting plate above the step plate 202.

Figure 7:
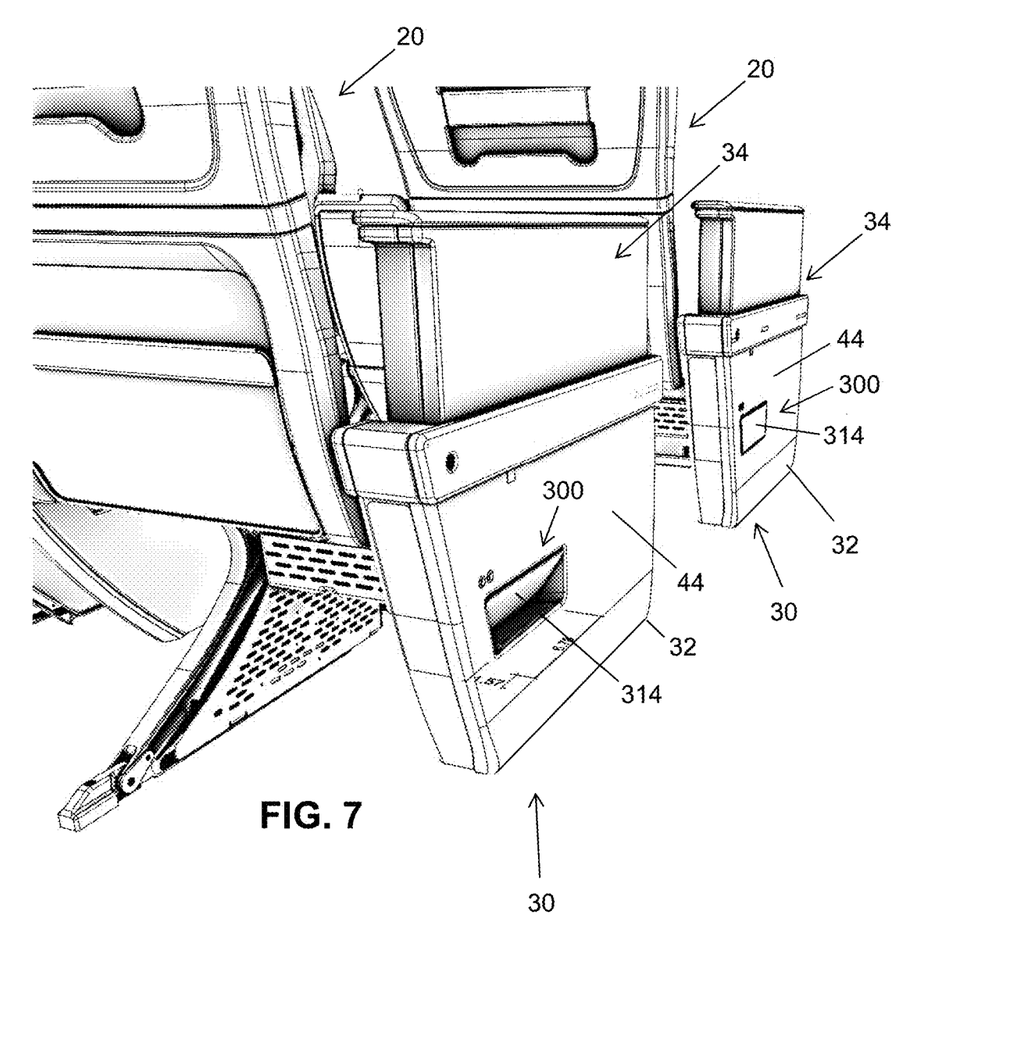
FIG. 7 is a perspective view of a sunken step assembly in a passenger seat end bay, according to the present disclosure, shown with a door thereof pivoted to an open position.
Figure 8:
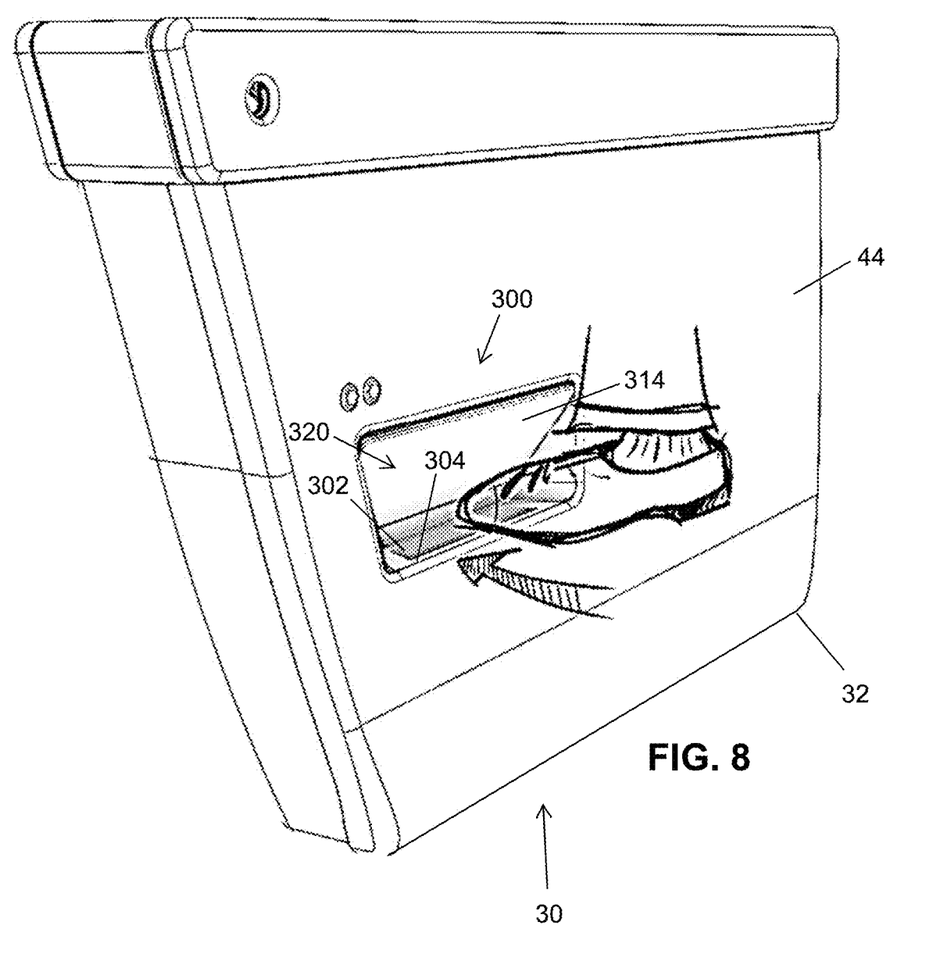
FIG. 8 is a perspective view of the sunken step of FIG. 7, shown as opening by user action.

In the example of FIGS. 7-8, the inventive step assembly 300 is implemented as installed in an aisle facing sidewall 44 of an end bay housing 32. Two end bays 30 are shown in FIG. 7, each with a respective sunken step assembly 300, according to the present disclosure. The step assembly 300 in the more forward end bay is shown with a door 314 thereof in a closed position. The door 314 of the step assembly 300 in the more rearward end bay is shown in a closed position.

The step assembly 300 has a sunken receptacle 320 mounted in the end bay housing 32. The door 314 is pivotally attached to the sidewall 44 or a mounting plate along an upper end of the receptacle 320. The door 314 may be spring loaded to maintain its stowed position, and/or gravity may return the door to the stowed position when the step assembly 300 is not in use. As shown in the forward end bay example of FIG. 7, the outer side of the door 314, in the closed position, covers or closes out the receptacle, essentially flush with the sidewall 44 of the end bay 32 for aesthetic purposes and to reduce its appearance and likelihood of notice and use by passengers accordingly.

Within the receptacle 320, the step assembly 300 has a step plate 302 that is accessible for use upon opening of the door 314. As the door pivots along its upper edge to the open position, the lower edge of the door swings to expose the step plate 302 for use. The step plate 302 may be implemented as stationary within end bay. Alternatively, this step-in design in at least one example folds inward as the door is pivoted open, defining the receptacle as the door opens. In that example, the step plate 302 may be pivotally attached along a first edge 304 thereof to the sidewall 44 or a mounting plate along a lower end of the receptacle 320, and upon the door opening, the step plate 302 pivots down from an upright essentially vertical stowed position 322 to an inward deployed horizontal position. Pivoting inward movement of the step plate 302 may be prompted simply by the inward pivoting movement of the door 314 as a foot of a flight attendant or other user is inserted into the step assembly 300 as shown in FIG. 8, with the door generally returning to the closed position ahead of the step plate 302 returning to its stowed position 322. This step-in design with the pivoting step plate 302 may be particularly useful to permit lowering of the armrest 34 into the fixed main housing 32 by the step plate 302 being in a low profile or flush position within the end bay in the stowed position. A lockout mechanism may be included that prevents the armrest 34 from lowering into the housing 32 when the door 314 is open, and permits the armrest 34 from lowering when the door is closed.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. An armrest assembly, comprising:
    a fixed housing having opposing sides, opposing ends, a top opening, and an interior space;
    an armrest disposed in the interior space through the top opening, the armrest vertically moveable relative to the fixed housing to adjust a height of the armrest; and
    a step assembly attached to one of the opposing ends the fixed housing, the step assembly comprising:
        i) a base attached to the fixed housing and including a mounting plate having a low profile and a fixed receptacle received in the interior space;
        ii) a step plate pivotally attached along a first end to the base along a lower end of the receptacle, the step plate pivotable between a stowed position in which the step plate is housed within the fixed receptacle and a deployed position in which the step plate is outside of the fixed receptacle, the step plate having a first side for supporting a foot; and
        iii) a release mechanism for releasing the step plate from the stowed position to the deployed position, the release mechanism attached to the fixed housing and positioned above the base, the release mechanism comprising a clip retaining the step plate in the stowed position until released, the clip mounted in an upper end of the receptacle above the step plate and engaging a second end of the step plate in the stowed position, the clip user actuated to release the step plate from the stowed position.

2. The armrest assembly of claim 1, further comprising a user actuatable button operably coupled to the clip and positioned on one of the opposing sides of the fixed housing and apart from the step assembly.

3. The armrest assembly of claim 1, wherein the release mechanism comprises a magnetic locking device releasable by a magnetic key.

4. The armrest assembly of claim 1, wherein the release mechanism comprises a pivoting lever pivotally attached to the fixed housing, the pivoting lever moveable between a latching position at which the second end of the step plate is retained by the clip when the step plate is pivoted upward to the stowed position and an unlatching position at which the step plate is released by the clip to pivot from the stowed position to the deployed position, wherein the pivoting lever automatically pivots to the latching position as the step plate is returned to the stowed position thereby automatically engaging the second end of the step plate with the clip.

5. The armrest assembly of claim 1, further comprising a ridge positioned along a second end of the step plate atop the first side.

6. The armrest assembly of claim 1, wherein movement of the step plate is spring biased toward at least one of the stowed and deployed positions.

7. The armrest assembly of claim 1, wherein a first portion of the base is attached to one of the opposing sides of the fixed housing, a second portion of the base wraps around a corner junction between the one of the opposing sides and an adjacent one of the opposing ends of the fixed housing, and a third portion of the base is attached to the adjacent one of the opposing ends of the fixed housing.

\* \* \* \* \*